(12) United States Patent
Mukherjee

(10) Patent No.: US 6,289,263 B1
(45) Date of Patent: Sep. 11, 2001

(54) SPHERICAL MOBILE ROBOT

(75) Inventor: Ranjan Mukherjee, East Lansing, MI (US)

(73) Assignee: Board of Trustees operating Michigan State University, East Lansing, MI (US)

( * ) Notice: Subject to any disclaimer, the term of this patent is extended or adjusted under 35 U.S.C. 154(b) by 0 days.

(21) Appl. No.: 09/211,346

(22) Filed: Dec. 15, 1998

Related U.S. Application Data

(60) Provisional application No. 60/069,796, filed on Dec. 16, 1997.

(51) Int. Cl.$^7$ .................................................. G06F 19/00
(52) U.S. Cl. ......................... 700/245; 700/251; 700/255; 700/262; 700/263; 74/490.03; 74/490.05; 74/490.06; 901/23; 901/29; 464/437
(58) Field of Search ................................... 700/245, 251, 700/262, 263, 255; 74/490.06, 490.03, 490.05; 464/106, 136; 901/23, 29, 27; 446/437, 458

(56) References Cited

U.S. PATENT DOCUMENTS

| | | | |
|---|---|---|---|
| 4,244,296 | * 1/1981 | Vertut | 104/138.2 |
| 4,501,569 | 2/1985 | Clark, Jr. et al. | 446/458 |
| 4,726,800 | 2/1988 | Kobayashi | 446/458 |
| 4,878,393 | * 11/1989 | Duta et al. | 74/490.06 |
| 5,297,981 | 3/1994 | Maxim et al. | 446/437 |

OTHER PUBLICATIONS

Mukherjee et al., Simple Motion Planning Strategies for Spherobot: A Spherical Mobile Robot, IEEE., pp. 2132–2137, Dec. 1999.*

Halme, A., Schönberg, T., and Wang, Y., 1996, "Motion Control Of A Spherical Mobile Robot", Proc. AMC'96–MIE. (6 pages).

Li, Z., and Canny, J., 1990, "Motion of Two Rigid Bodies with Rolling Constraint", IEEE Transactions on Robotics and Automation, vol. 6, No. 1, pp. 62–72.

Koshiyama, A., and Yamafuji, K., 1993, "Design and Control of an All–Direction Steering Type Mobile Robot", International Journal of Robotics Research, vol. 12, No. 5, pp. 411–419.

Bicchi, A., Balluchi, A., Prattichizzo, D., and Gorelli, A., "Introducing the "SPHERICLE": an Experimental Testbed for Research and Teaching in Nonholonomy", (7 pages).

Brown, Jr., H.B., and Xu, Y., Sep. 1997, "A Single–Wheel, Gyroscopically Stabilized Robot", IEEE Robotics & Automation Magazine.

International Search Report for PCT/US98/26626 dated Feb. 22, 1999, 4 pages.

* cited by examiner

Primary Examiner—William A. Cuchlinski, Jr.
Assistant Examiner—McDieunel Marc
(74) Attorney, Agent, or Firm—Harness, Dickey & Pierce, P.L.C.

(57) ABSTRACT

A spherical robot having a spherical body and a drive mechanism. The spherical body defines a cavity and a center. The drive mechanism is disposed within the cavity, coupled to the spherical body, wherein said drive mechanism includes a plurality of masses coupled to said body which are radially positionable within said cavity to create a moment about said center of said body, and is adapted to create a moment about the center of the body. This moment causes the body to rotate.

16 Claims, 3 Drawing Sheets

SPHERICAL MOBILE ROBOT

CROSS-REFERENCE TO RELATED APPLICATIONS

This application claims priority to United States Provisional Patent Application No. 60/069,796 filed on Dec. 16, 1997.

BACKGROUND OF THE INVENTION

1. Technical Field

The present invention relates to mobile robots and, more particularly, to a robot having a spherical exo-skeleton and an internal propulsion mechanism.

2. Discussion

Mobile robots have been studied for decades. Researchers have investigated robot applications ranging from material transportation in factory environments to space exploration. A particularly extensive area of mobile robot application is found in the automobile industry where robots transport components from manufacturing work stations to the assembly lines. These automated guided vehicles (AGVs) follow a track on the ground and have the ability to avoid collisions with obstacles in their path. Autonomous mobile robots designed for planetary exploration and sample collection during space missions have also received significant attention in recent years. This attention has resulted in advancement of mobile robot technology and a corresponding increase in the effectiveness of mobile robots in a wide range of applications.

Mobile robot technology has primarily focused on robot designs having a body with wheels for mobility. This has led to advancements in motion planning and control of the rolling wheel. Notwithstanding these developments, wheeled mobile robots have significant deficiencies that have not been adequately overcome. For example, wheeled robots often times have difficulty traversing rough terrain. While this problem may be reduced by increasing the size of the wheels of the robot, increases in wheel size cause various undesirable consequences including an increase in the overall size and weight of the robot. Unfortunately, increases in wheel sizes do not necessarily result in corresponding increases in operational features such as payload capacity. Also, wheeled robots are adversely effected by harsh operating environments such as heat, chemicals, and the like.

The present invention relates to a spherical mobile robot that moves by rolling over terrain The control of a rolling sphere involves reconfiguration of its position and orientation coordinates. Control strategies developed for wheeled mobile robots do not directly relate to precise control of the reconfiguration of the rolling sphere.

Wheeled mobile robots belong to a class of systems known as nonholonomic systems. Feedback control strategies developed for nonholonomic systems are typically smooth and time varying, piecewise non-smooth and time-invariant, or a hybrid combination of the two. Such strategies, however, are applicable to nonholonomic systems that can be converted into a special form, known as chained form. It has not been possible to convert the kinematic model of the sphere into chained form. Therefore, the above strategies do not lend themselves directly to the reconfiguration problem of the rolling sphere.

Typically, among control strategies for nonholonomic systems, time-varying controllers suffer from slow rates of convergence. Faster convergence rates can be achieved through the design of piecewise non-smooth time-invariant controllers. However, piecewise non-smooth time-invariant controllers may involve multiple switchings and may lead to undesirable chattering. Hybrid controllers are based on switchings at discrete-time instants between various low level smooth controllers. Such controllers tend to combine the advantages of both the time-varying and time-invariant controllers.

While non-smooth control is generally sufficient to provide operational capability to a spherical robot of the type described herein, a non-smooth technique has undesirable characteristics including intermittent motion and chattering. A non-smooth controller is particularly undesirable in the present invention in view of the spherical robot's internal drive mechanism. More particularly, the internal drive mechanism may be limited in its ability to generate the large accelerations necessary for non-smooth control of the system.

SUMMARY OF THE INVENTION

In view of the above, a need exists for a mobile robot that effectively traverses rough terrain. Accordingly, the present invention includes a spherical exo-skeleton and an internal mechanism for propulsion. The spherical exo-skeleton of the present invention may be increased or decreased in size as necessary to satisfy various design and operational parameters including payload capacity and mobility in rough terrain. Specifically, as the spherical diameter of the mobile robot increases, its ability to traverse rough terrain and its payload capacity also increase. The drive mechanism of the present invention described and claimed herein provides mobility by continuously distributing or spinning masses within the spherical cavity that creates a moment about the center of the sphere thereby enabling the sphere to accelerate or decelerate, move with constant velocity, or servo at a point as and when necessary. The motion of the sphere is controlled through sensing and feedback.

The spherical robot has a high degree of stability and the capability for rapid maneuvers and movement over rough terrain. With an internal power source, sensors for feedback, a microprocessor for motion control, and other hardware, the robot achieves autonomy and functions as a mobile robot. The spherical robot has superior mobility compared to wheeled robots because a sphere can roll in two directions. Additionally, the radius of the sphere will be relatively large since the sphere represents the outer perimeter of the robot.

Other advantages of the present invention include the ability to fabricate the exo-skeleton of the spherical robot from materials that protect the operating components of the robot during use in harsh environments. For example, the exo-skeleton may be formed of an armor-type material to provide a robotic soldier, fire and heat resistant material for fire prevention/fighting applications, and other condition resistant material for robotic applications in other harsh environments.

A simple control strategy known in the art is contemplated for use with the present invention when precise control of the position or the orientation of the sphere, but not both, is required. The present invention further includes a feedback control strategy for the control of both position and orientation coordinates of the spherical robot. This control strategy asymptotically converges the spherical robot from any Cartesian coordinates x,y, to any other, and at the same time reorients the sphere such that a given point on the surface of the sphere always appears at the top upright position.

The present invention includes a spherical robot having a spherical body and a drive mechanism. The spherical body defines a cavity and a center. The drive mechanism is disposed within the cavity and coupled to the spherical body and has a plurality of masses that can be positioned or spun within the cavity to create a moment about the center of the body that selectively cause the body to rotate. The present invention also includes a method for moving a spherical robot from a starting position to a target that includes the steps of providing a robot having a spherical body defining a cavity with a drive mechanism disposed in the cavity and coupled to the body, sensing the position of the body relative to the target, calculating target angular velocities for rotating the body to position the body at the target in a selected orientation, and actuating the drive mechanism to rotate the body at the target angular velocities.

BRIEF DESCRIPTION OF THE DRAWINGS

The objects and features of this invention will become further apparent from a reading of the following detailed description taken in conjunction with the drawings, in which.

DETAILED DESCRIPTION OF A PREFERRED EMBODIMENT

Figure 1:
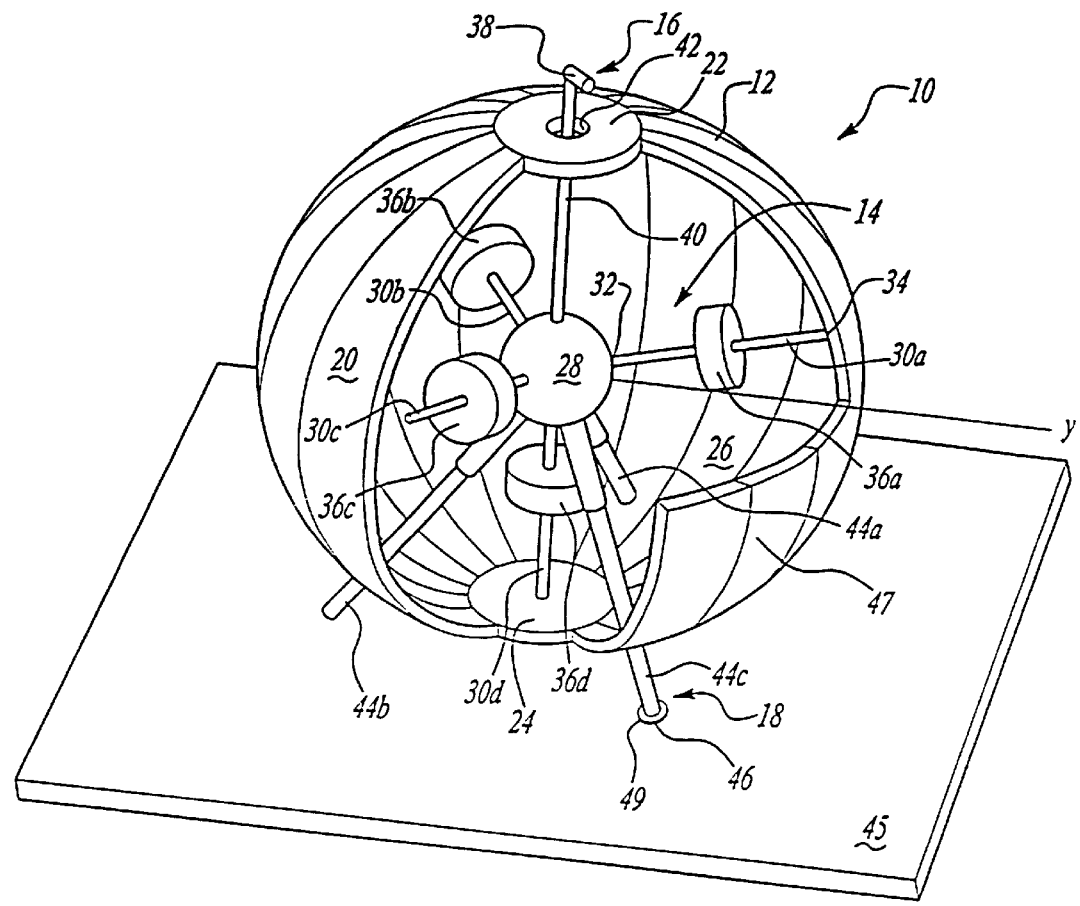
FIG. 1 is a perspective view of a spherical mobile robot according to the present invention with a portion of the spherical skeleton thereof removed for clarity.

As illustrated in FIG. 1, spherical robot 10 includes a exo-skeleton 12 surrounding a propulsion mechanism 14. Spherical robot 10 also includes a variety of task performing components including camera assembly 16 and stabilizers 18 which are designed for retraction within exo-skeleton 12 prior to mobilization of robot 10.

Exo-skeleton 12 is illustrated in FIG. 1 as including multiple petal-like arcuate elements 20 extending from disk-like hubs 22 and 24 to define an internal chamber 26. Each petal-like element 20 preferably includes an internal truss sandwiched between inner and outer skins (not shown). The trusses within each element 20 may be structurally connected to one another and/or to the skins via methods generally known in the art. Moreover, those skilled in the art will appreciate that the specific structural design of exo-skeleton 12 may vary depending upon the specific application for spherical robot 10. For example, an internal truss (not shown) composed of multiple spokes similar in configuration to a bicycle wheel can be used to provide additional rigidity to the spherical exo-skeleton.

The material from which the inner and/or outer skins of exo-skeleton 12 are formed may vary based upon the particular application for the spherical robot. More particularly, it is contemplated that the spherical robot will be uniquely useful in hazardous environments such as fire-fighting, chemical factories, nuclear power plants, space exploration, and military applications. An appropriately resistant material may be used to form exo-skeleton 12 in order to adequately protect the structural and operational features of propulsion mechanism 14 and the task performing components of the robot. For example, an exo-skeleton formed of or covered with a material such as Kevlar (manufactured by DuPont) provides an armored robot capable of performing military applications such as reconnaissance, terrorist counter measures or in-combat applications.

The external configuration of exo-skeleton 12 protects cavity 26 which houses propulsion mechanism 14 and accommodates a properly secured payload (not shown). As illustrated in FIG. 1, propulsion mechanism 14 generally includes a center hub 28 and a plurality of radially extending spokes 30a, 30b, 30c, and 30d. As illustrated with reference to spoke 30a, each of spokes 30a, 30b, 30c, and 30d include a first end 32 structurally fixed to center hub 28 and a second end 34 structurally fixed to a position along exo-skeleton 12. As will be described in detail hereinafter, a reciprocatable mass is coupled to each spoke for controlled movement so as to create moments about hub 28.

In the embodiment illustrated in FIG. 1, center hub 28 houses a power source operatable in the rolling environment of sphere 10. Preferably, the power source has a capacity sufficient to operate all of the operating components of spherical robot 10 including masses 36a, 36b, 36c, and 36d as well as selectively extending and retracting camera assembly 16 and stabilizers 18 as needed.

The task performing components of robot 10 are illustrated in FIG. 1 to include camera assembly 16 and stabilizers 18. Camera assembly 16 includes a camera 38 coupled to a deployment shaft 40 which operates to selectively extend and retract camera 38 through a camera port 42 formed in hub 22. Hub 22 further includes a shutter mechanism (not shown) that effectively seals port 42 after camera 38 is retracted therethrough. Those skilled in the art will appreciate that a variety of control and drive mechanisms for the shutter may be employed. It should also be appreciated that the field of view of camera 38 is optimized when spherical robot 10 is in its upright position as illustrated in FIG. 1. The control of the robot trajectory for proper camera deployment is provided by the control mechanisms discussed in detail with reference to FIGS. 2 and 6.

Stabilizer 18 is illustrated to include a tripod of telescoping limbs 44a, 44b, and 44c deployable to engage the surface 45 surrounding robot 10 to fix the position and orientation of the robot. Proper deployment of stabilizer 18 requires an upright orientation of spherical robot 10. However, if the orientation of the robot 10 is not exactly upright, the stabilizers may be deployed to bring the robot 10 to its upright position. In, the preferred embodiment, limbs 44a, 44b, and 44c are deployed by telescopic extension through openings (not shown) in the exo-skeleton. When the limbs are retracted prior to the robot resuming motion, a terminal end 46 of each limb is positionable flush with the outer skin 47 of the sphere. A cap 49 at terminal limb end 46 seals against outer skin 47 to isolate the interior cavity 26 from the environment surrounding exo-skeleton 12. By retracting the limbs flush with the outer skin of the sphere, the limbs do not restrict rotation of the robotic sphere and form part of the internal truss of exo-skeleton 12 to provide additional structural rigidity.

Various other task performing components may be used with spherical robot 10 without departing from the scope of the invention defined by the appended claims. For example, retractable manipulators (not shown) may also be provided with spherical robot 10 to extend outward, either telescopically or otherwise, through appropriate openings (not shown) in the exo-skeleton 12 for grasping and manipulating objects. The structural configuration and operational features of the manipulators and various other task performing robotic components are generally known in the art.

The structure, operation, and control of the movement of robot 10 through propulsion mechanism 14 will now be described. It is important that the robot moves from a starting position to a target position in a controlled manner so as to come to rest in its upright orientation. This orientation optimizes the effectiveness of camera 16 and ensures the usefulness of limbs 18 and the manipulators. For clarity, the term configuration is used herein to encompass both the position and orientation of the robot. Consistent with accepted nomenclature, the term position refers to the location of the robot in a two-dimensional external coordinate system. The term orientation as used herein refers to the two orientation variables that are required to bring a point (point of camera deployment) on the surface of the sphere to the top upright position.

Figure 2:
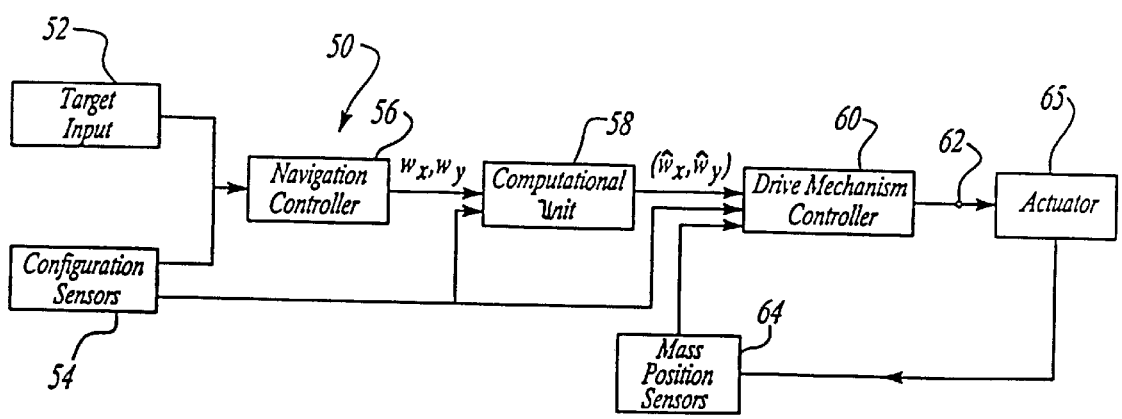
FIG. 2 is a schematic illustration of a controller for the spherical mobile robot illustrated in FIG. 1.

Propulsion mechanism 14 includes a controller 50 having a microprocessor or other computational mechanism known in the art. Controller 50 is schematically illustrated in FIG. 2 to include a target coordinate receiving mechanism 52 and a plurality of configuration sensors 54. Various input means may be used to communicate target data to receiving mechanism 52. Configuration sensors 54 are also generally known in the art and provide controller 50 with information regarding the three orientation coordinates of spherical robot 10.

It is contemplated that configuration sensors 54 may include proximity sensors, dead-reckoning ranging devices, and vision sensors. The selection of the specific sensor technology most appropriate for spherical robot 10 will be based upon the benefits provided by each technology and upon the specific application of the robot. For example, proximity sensors generally indicate the presence of nearby objects and may also be used to detect metals, temperature extremes, and light sources. Dead reckoning sensors may be appropriate where the relation of the robot position relative to another position based upon incremental movements are important. Dead reckoning sensors may include internal navigation systems such as an accelerometer or gyroscope that provide information on heading, position, and velocity. Ranging devices such as sonars and laser range finders may be appropriate in poor lighting environments.

In the following description of the mobility of spherical robot 10, the robot is described as including pressure sensors embedded in the spherical exo-skeleton 12 in order to provide two robot orientation coordinates. The third orientation coordinate is obtained by using a gyroscope having its angular momentum vector pointing in a specific direction in the horizontal plane. The configuration sensors communicate with a navigation controller 56 and a drive mechanism controller 60. As is described in detail below, navigation controller 56 determines the configuration of the sphere and angular velocities necessary to converge the sphere to a desired position and orientation. The desired angular accelerations of the sphere are calculated during robot movement by an on-line numerical computational unit 58 from the commanded angular velocities of the robot made available by navigation controller 56 and the current configuration of the robot made available by the configuration sensors 54. Stated differently, computational unit 58 calculates the angular accelerations necessary to achieve the target velocities and communicates this data to drive mechanism controller 60.

As previously mentioned, control strategies for nonholonomic systems may be classified under smooth time-varying control, piecewise non-smooth time-invariant control, and strategies that are a hybrid combination of the above. These strategies are directly applicable to precisely control systems that can be converted into chained form. However, as the kinematic model of the rolling sphere cannot be converted into chained form, the existing strategies are not directly extendable to the rolling sphere to precisely control the sphere's configuration. However, while deficient in certain regards, control strategies for non-holonomic systems may be used by controller 56 to manage movement of sphere 10. The mathematical basis and implementation of the existing control strategies are generally known in the art and a detailed description thereof is neither provided herein nor necessary for those skilled in the art to understand the structure and operation of the present invention.

Figure 5:
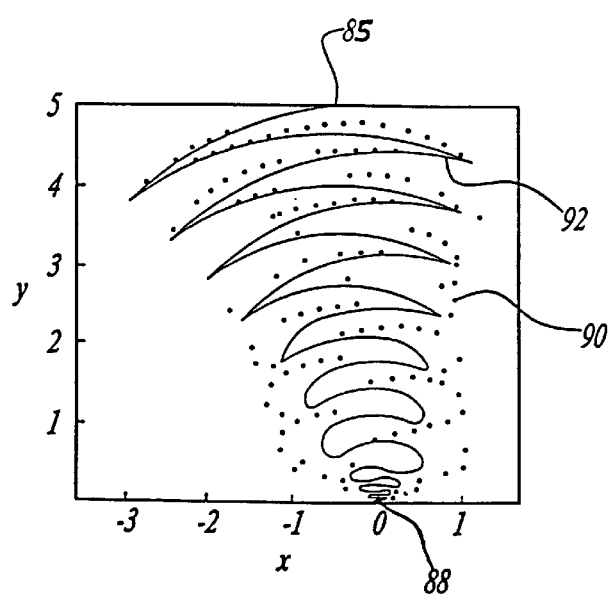
FIG. 5 illustrates the path of the spherical robot from a first configuration to a second configuration.

In the preferred embodiment of the present invention navigation controller 56 does not include the conventional control techniques discussed above. Rather, the controller includes a technique for nonlinear oscillators which asymptotically converges the robot to its desired configuration as shown in FIG. 5.

The preferred control strategy will now be described with reference to FIG. 3. However, those skilled in the art will appreciate that other techniques for asymptotically converging the robot to its desired configuration may be used with the present invention without departing from the scope thereof as defined by the appended claims.

Figure 3:
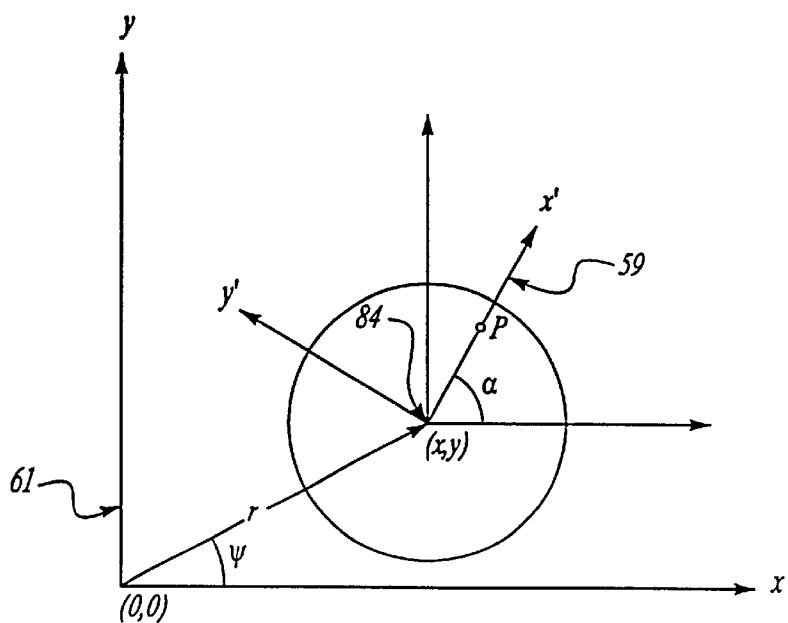
FIG. 3 illustrates the spherical robot relative to external and internal two dimensional coordinate systems.
Figure 4:
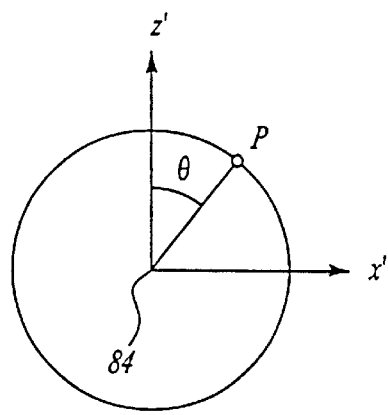
FIG. 4 illustrates the spherical robot relative to a third dimension of the internal coordinate system.

The preferred control strategy for addressing the reconfiguration control problem has the task of converging the state variables x, y, and θ shown in FIGS. 3 and 4 to their zero values. By doing so, the sphere is moved to its target position and orientation. These variables evolve according to the following equations:

$$\dot{X}=(y \cot \theta + \sin \alpha)\omega_{x'} + \cos \alpha \omega_{y'} \quad (1)$$

$$\dot{y}=-(X \cot \theta + \cos \alpha)\omega_{x'} + \sin \alpha \omega_{y'} \quad (2)$$

$$\dot{\alpha}=-\cot \theta \omega_{x'} \quad (3)$$

$$\dot{\theta}=\omega_{\omega'} \quad (4)$$

In the above equations $\omega_{x'}$ and $\omega_{y'}$ are angular velocities of the sphere about the x' and y' axes determined in a manner known in the art by navigation controller 56 using input from configuration sensors 54. Axes x' and y' are oriented at an angle α with respect to the x and y axes of an external coordinate system 61. Finally the angle θ is the angle between axis z' and the radial position of upright point P (FIG. 4). The control inputs in terms of $\omega_{x'}$ and $\omega_{y'}$ for equations (1), (2), (3) and (4) are as follows:

$$\omega_{y'}=-\theta+\mathrm{sat}(r, \pi/3)\cos t \quad (5)$$

$$\omega_{x'}=-\mathrm{sat}(r, \pi/4)\sin \theta \; \mathrm{sign}\, \theta(1+\mathrm{sign}\, \theta \tan h[100(\psi+\pi/2-\alpha)]) \quad (6)$$

where $r \geq 0$, ψ are polar coordinates of the center 84 of the sphere and the functions sat (r, *) and sign (*) are defined as follows:

$$\mathrm{sign}(\theta)=\begin{cases} 1 \text{ if } \theta>0 \\ 0 \text{ if } \theta=0 \\ -1 \text{ if } \theta<0 \end{cases} \quad (7)$$

$$\mathrm{sat}(r,a)=\begin{cases} r \text{ if } 0 \leq r \leq a \\ a \text{ if } r>a \end{cases} \quad (8)$$

The results of the control strategy discussed above is illustrated in FIG. 5 which demonstrates the motion of the sphere from an initial configuration 85 to a final configuration 88. As shown, the sphere can be reconfigured to move to a proper position and orientation at final configuration 88 such that point P, indicative of the position of camera port 42, is in an upright position as the sphere reaches the desired final position (0,0). The dotted line 90 denotes the projection of point P on the x-y surface and the continuous line 92 denotes the motion of the center 84 of the sphere for an exemplary reconfiguration path.

Returning now to the description of the control schematic illustrated in FIG. 3, the computational unit 58 uses the angular velocity outputs from navigation controller 56 and the data from configuration sensors 54 to determine the angular accelerations required to change the angular velocities of the sphere from the calculated value to the target velocities provided by controller 56. The calculated angular accelerations ($\dot{\omega}_x$ and $\dot{\omega}_y$) are communicated to the drive mechanism controller 60 which repositions the masses through drive mechanism 14 to achieve the target velocities as hereinafter described. Configuration sensors 54 continually feed data regarding the configuration of spherical robot 10 to positioning controller 56 and computational unit 58 so that the actual rotational velocities of the spherical robot are continually adjusted to converge robot 10 to its target position and orientation.

The operation of propulsion mechanism 14 and drive mechanism controller 60 will now be described with reference to FIGS. 2 and 6. In general, propulsion mechanism 14 propels spherical robot 12 by distributing masses 36a, 36b, 36c, and 36d along the respective spokes 30a, 30b, 30c, and 30d. Those skilled in the art will appreciate that other propulsion mechanisms may be used without departing from the scope of the invention as defined by the appended claims. For example, control momentum gyroscopes or spinning wheels, whose spin axes can be changed while its spin rates are kept unchanged, or whose spin rates can be changed while its spin axes are kept fixed, can be used to propel the spherical robot. The operations and principles of such gyroscopes and spinning wheels are generally known in the art and, in view of the description of the spherical robot and drive mechanism described herein, may be used with the present invention according to the known operation.

In the preferred embodiment, controller 60 continuously monitors and positions the masses in a synchronized fashion to achieve the desired angular accelerations of the sphere. As illustrated in FIG. 2, drive mechanism controller 60 obtains data regarding the internal configuration of the four masses 36a–36d from mass position sensors 64 (FIG. 2) as well as data regarding the configuration of the sphere from configuration sensors 54. From this data, drive mechanism controller 60 calculates the proper positioning of masses 36a, 36b, 36c, and 36d and sends an appropriate control signal 62 to a mass actuator assembly 65 (FIG. 2) which then positions the masses to generate the desired moment about origin 67 (FIG. 6). Those skilled in the art will appreciate that the moment about origin 67 and the corresponding angular accelerations about axes i ($\omega_x$) and j ($\omega_y$) may be readily calculated through consideration of the radial position of the masses, the collective inertia of the sphere and the four masses, as well as the instantaneous angular acceleration of the sphere.

It should be appreciated that as the spherical robot rotates about axes i and j, the command inputs generated by drive mechanism controller 60 can generate a constant or varying angular acceleration. At a constant acceleration or deceleration, the sphere can achieve a large translational velocity. The kinetic energy associated with the translational motion can be expended to climb slopes of considerable incline. Those skilled in the art will further recognize that even during the constant acceleration phase, controller 60 oscillates the masses with an increasingly higher frequency as the angular velocity of the sphere increases. As a result, the capacity of the mass actuators will normally dictate the maximum acceleration achievable by the sphere. While no actuators are illustrated in the drawings, each mass may include a separate actuator or a single actuator for the four masses may be included in the housing for power source 28. Numerous conventional techniques may be used to move masses 36a–36d along spokes 30a–30d such as by mechanical engagement. The selection of an appropriate actuator(s) is within the general knowledge of one skilled in the art.

Figure 6:
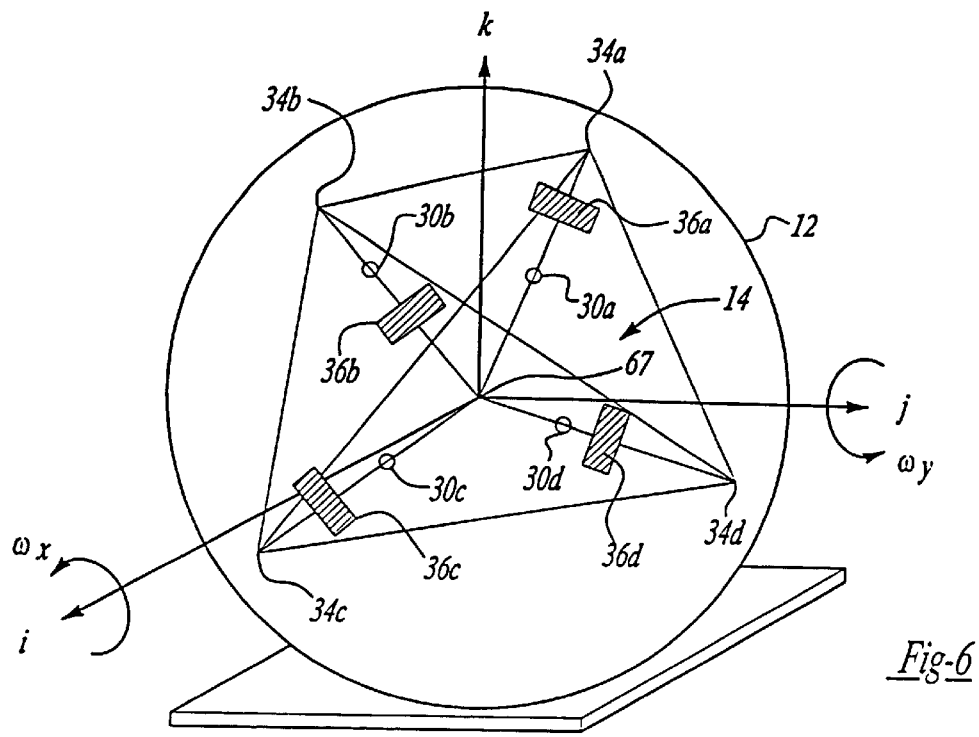
FIG. 6 is a schematic illustration of the sphere illustrated in FIG. 1.
Figure 7:
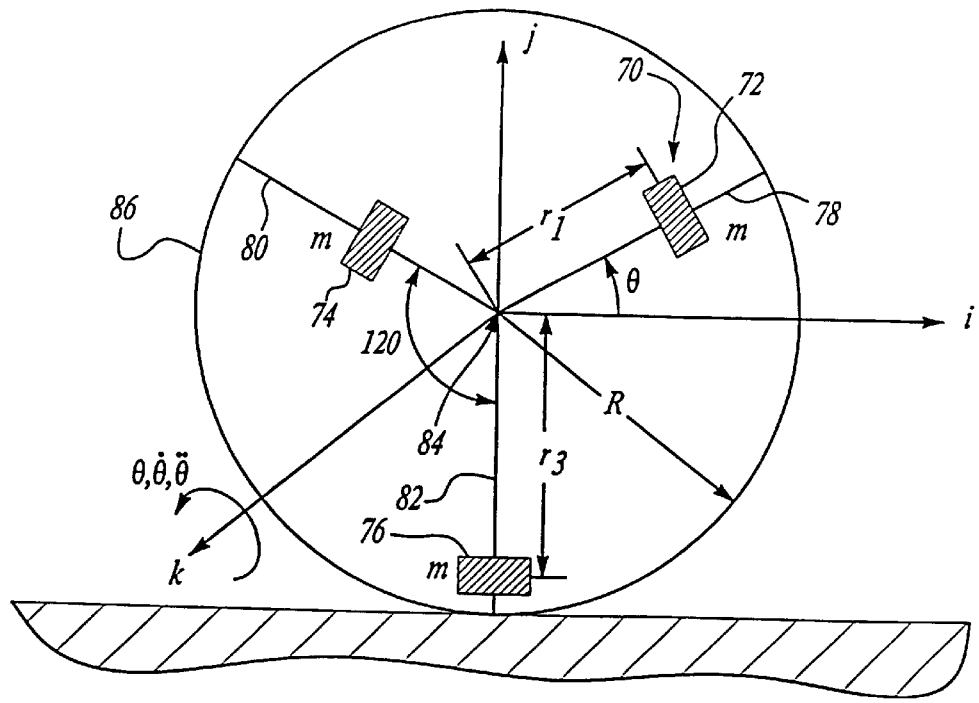
FIG. 7 is a schematic illustration of a rolling disk with a propulsion mechanism similar to that used in the present invention.

In order to ensure a complete understanding of the propulsion mechanism and the control of the masses therein, the following description of the propulsion mechanism for a rolling disk is provided with reference to FIG. 7. The generation of equations representative of a four mass system such as that used with the spherical robot illustrated in FIGS. 1–6 will be readily apparent to those skilled in the art from the following description.

As shown in FIG. 7, a propulsion mechanism 70 includes three equal masses, m, designated 72, 74, and 76 that are movable radially along the three spokes 78, 80, and 82, subtending equal angles of 120 degrees at the center 84 of the disk 86. The three masses, assumed to be point masses, are located at radial distances $r_1$, $r_2$, and $r_3$, respectively, from the center of the disk. The mass located at distance $r_1$ subtends and angle of $\theta$ with the horizontal axis, measured counter-clockwise. The mass and the inertia of the disk about its center are M and I.

The moment due to the first mass, about the center of rotation 84, is written as $$[r_1(\cos \theta i + \sin \theta j) + Rj] \times -mgj = -mgr_1 \cos \theta k$$

After computing the moment due to the other two masses, the net moment is written as $$\Sigma r = -mg[r_1 \cos \theta + r_2 \cos(\theta+120) + r_3 \cos(\theta+240)]k = \tfrac{1}{2}mg[\cos \theta(r_2 + r_3 - 2r_1) + \sqrt{3} \sin \theta(r_2 - r_3)]k \qquad (9)$$

where k is the unit vector directed out of the plane of the paper. The angular acceleration of the disk can be obtained by applying Newton's law.

$$I_r \ddot{\theta} = \tfrac{1}{2}mg[\cos \theta(r_2 + r_3 - 2r_1) + \sqrt{3} \sin \theta(r_2 - r_3)] \qquad (10)$$

where $I_r$ is the collective inertia of the disk and the three masses about the center of rotation 84 and is given as $$I_r = (I + MR^2) + m[3R^2 + r_1^2 + r_2^2 + r_3^2 - R[\sin \theta(r_2 + r_3 - 2r_1) - \sqrt{3} \cos \theta(r_2 - r_3)]] \qquad (11)$$

In considering the situation where the three masses are commanded to perform simple harmonic motion along the spokes of the disk, if the masses oscillate with the same frequency as that of the rolling disk and differ only in their phases by 120 degrees, then The above choice of $r_1$, $r_2$, and $r_3$ guarantees that the position coordinates of $$r_1 = 0.5\,R[1-\cos \theta],\ r_2 = 0.05\,R[1-\cos(\theta+120)],\ r_3 = 0.5\,R[1-\cos(\theta+240)] \qquad (12)$$

the masses satisfy the physical constraints $0 \leq r_i \leq R$, i=1, 2, 3. Substituting Eq.(12) in Eq.(10), generates $$\ddot{\theta} = \frac{0.75 \, mgR}{I + (M + 4.125 \, m)R_2} \quad (13)$$

The choice of command inputs given by Eq.(12) can generate a constant angular acceleration of the disk. On the other hand, if the command inputs are chosen as $r_1$=0.5 R[1+cos θ], $r_2$=0.5 R[1+cos(θ+120)], $r_3$=0.5 R[1+cos(θ+ 240)]    (14)

the disk will undergo a constant deceleration.

Those skilled in the art will appreciate that the propulsion mechanism 14 for the rolling sphere, most clearly illustrated in FIG. 6, includes four equal masses 36a–36d movable along spokes 30a–30d that form a rectangular tetrahedron 34a, 34b, 34c, and 34d inside the spherical exo-skeleton 12. As discussed above, the positioning of masses 36a–36d along spokes 30a–30d selectively generates moments about the center or rotation 67 (FIG. 6) to move the sphere in accordance with inputs received from sphere rotation controller 58, configuration sensors 54, and mass position sensors 64 (FIG. 2).

From the above description, those skilled in the art will appreciate that spherical robot 10 is a unique mobile robot system that widens the field of applications for mobile robots. The superior locomotion capabilities of the spherical robot as well as the proper configuration of an exo-skeleton for specific applications provides a robot usable in a variety of environments. The internal drive mechanism and remote controllers provide the robot with maximum stability and the ability to move over rough terrain with relative ease.

Various other advantages and modifications will become apparent to one skilled in the art after having the benefit of studying the teachings of the specification, the drawings and the following claims.

What is claimed is:

1. A spherical robot comprising:
   a spherical body defining a cavity and a center; and
   a drive mechanism having a shaft fixed to said spherical body disposed within said cavity and coupled to said spherical body, wherein said drive mechanism includes a plurality of masses coupled to said body which are radially movable within said cavity to create a moment about said center of said body, said moment causing said body to rotate.

2. The spherical robot of claim 1 further including an actuating assembly coupled to said body, said actuating assembly adapted to position said masses within said cavity in response to a positioning signal.

3. The spherical robot of claim 2 further including a controller for generating said positioning signal.

4. The spherical robot of claim 2 wherein said drive mechanism includes a frame fixed to said body and wherein said plurality of masses are movably coupled to said frame.

5. The spherical robot of claim 4 wherein said frame includes four spokes intersecting at a hub, said plurality of masses including four masses, said four masses being coupled for sliding movement along said four spokes.

6. The spherical robot of claim 5 further including an actuating assembly adapted to slide said four masses along said four spokes in response to said positioning signal.

7. The spherical robot of claim 2 further including sensor means and a controller communicating with said sensor means, said sensor means for generating configuration data for the spherical body.

8. The spherical robot of claim 7 wherein said controller includes a navigation controller having input means for receiving target data and said configuration data from said sensor means, said navigation controller generating target angular velocities.

9. The spherical robot of claim 8 wherein said sensor means further includes mass position sensors for generating mass position data, wherein said controller further includes a drive mechanism controller, said drive mechanism controller receiving said configuration data, said target angular velocities, and said mass position data, said drive mechanism controller generating said positioning signals and communicating said positioning signals to said actuating assembly.

10. The spherical robot of claim 1 further including telescoping limbs movable between a retracted position wherein said limbs are retracted into said cavity and an extended position wherein said limbs extend from said cavity.

11. The spherical robot of claim 1 further including a camera movable between a retracted position wherein said camera is retracted into said cavity and an extended position wherein said camera extends from said cavity.

12. The spherical robot of claim 1 further including a controller and sensing means communicating with said controller for determining configuration data for the spherical body, said controller communicating with said drive mechanism to move said sphere from a starting configuration to a target configuration.

13. The spherical robot of claim 12 wherein said controller is adapted to move said spherical body to said target configuration such that said spherical body is in an upright orientation at said target configuration.

14. A method for moving a spherical robot from a first configuration to a second configuration comprising the steps of:
   (a) providing a robot having a spherical body defining a cavity with a drive mechanism disposed in said cavity and coupled to said body wherein said drive mechanism includes a shaft fixed to said spherical body and a plurality of masses coupled to said shaft which are radially positionable within said cavity to create a moment about said center of said body;
   (b) sensing the position and orientation of said body;
   (c) calculating target angular velocities for rotating said body to said second configuration; and
   (d) actuating said drive mechanism to rotate said body at said target angular velocities.

15. The method of claim 14 wherein said body defines a center, wherein said drive mechanism includes a plurality of masses coupled to said body and positionable within said cavity to create a moment about said center, and wherein the step of actuating said drive mechanism includes positioning said masses within said cavity so that said body rotates at said target angular velocities.

16. The method of claim 15 wherein said drive mechanism includes an actuating assembly coupled to said body and adapted to position said masses within said cavity in response to a positioning signal, and wherein the step of actuating said drive mechanism includes generating said positioning signal and communicating said positioning signal to said actuating assembly.

* * * * *